(12) United States Patent
Rutta

(10) Patent No.: US 6,476,512 B1
(45) Date of Patent: Nov. 5, 2002

(54) ELECTRICITY GENERATING WAVE PIPE (OR EGWAP)

(76) Inventor: Stanley Rutta, 330 Audubon Rd., Englewood, NJ (US) 07631

( * ) Notice: Subject to any disclaimer, the term of this patent is extended or adjusted under 35 U.S.C. 154(b) by 53 days.

(21) Appl. No.: 09/933,794

(22) Filed: Aug. 21, 2001

(51) Int. Cl.[7] ............................................... F03B 13/10
(52) U.S. Cl. ........................................................ 290/42
(58) Field of Search ............................ 290/42, 43, 53; H03B 13/10

(56) References Cited

U.S. PATENT DOCUMENTS

| 3,706,507 A | * | 12/1972 | Dunbar | ........................... 415/5 |
| 4,260,901 A | * | 4/1981 | Woodbridge | ................. 290/42 |

* cited by examiner

*Primary Examiner*—Nestor Ramirez
*Assistant Examiner*—Karen Addison

(57) ABSTRACT

This invention produces electrical or other types of energy using ocean waves and a hollow pipe (tube or container) system with an internal float that uses a counter weight to work gears that turn a generator.

6 Claims, 4 Drawing Sheets

US 6,476,512 B1

ELECTRICITY GENERATING WAVE PIPE (OR EGWAP)

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The Electricity Generating Wave Pipe System is an invention that transforms ocean wave movement into electrical energy. Ocean waves are harnessed as a source of nonpolluting, endlessly renewable, electric power. The invention is a unique concept utilizing an internal float system that rides inside a tube or pipe. The pipe guides and protects the float from elements and from float skew. Moving parts are easily maintained and accessible above the water level. Rutta's Electricity Generating Wave Pipes are relatively inexpensive to produce and long lasting. The system does not produce heat discharge or pollutants. Units are used for electrical output and applications can be applied that do such things as charge batteries or create hydrogen gas and oxygen by electrolysis for use in fuel cells.

BRIEF SUMMARY OF THE INVENTION

Rutta's Electricity Generating Wave Pipes are meant to be an inexpensive, non-polluting, simple to maintain, method of electrical generation. The source of power, ocean waves, is renewable and this invention will harness this power to create electricity. The system can produce electricity in a complete range of conditions that extend from calm (small rolling) to stormy ocean waves.

The Electricity Generating Wave Pipe System is made up of one or more Electricity Generating Wave Pipe units. Each unit consists of a separate, non-corroding, plastic, fiberglass or metal pipe (or hollow pole) of sufficient height and width to contain a float and pulley system and support a small generator. Ocean waves power the pipe's internal system in such a way that electricity is produced.

BRIEF DESCRIPTION OF THE SEVERAL VIEWS OF THE DRAWING

This application contains four views of the invention that show its structure.

The first figure (labeled "FIG. 1") is an outer view of the Electricity Generating Wave Pipe. Labeled elements of FIG. 1 include: the pipe (reference character 1), an aperture in the pipe's wall (reference character 2), an ocean wave (reference character 3), the ocean floor (reference character 4), the pipe anchored below the ocean floor (reference character 5), a hinge connecting the pipe with its lid (reference character 6), the protected electrical plug (reference character 7), the pipe cover (reference character 8), and the cover locking latch (reference character 9).

Figure 1:
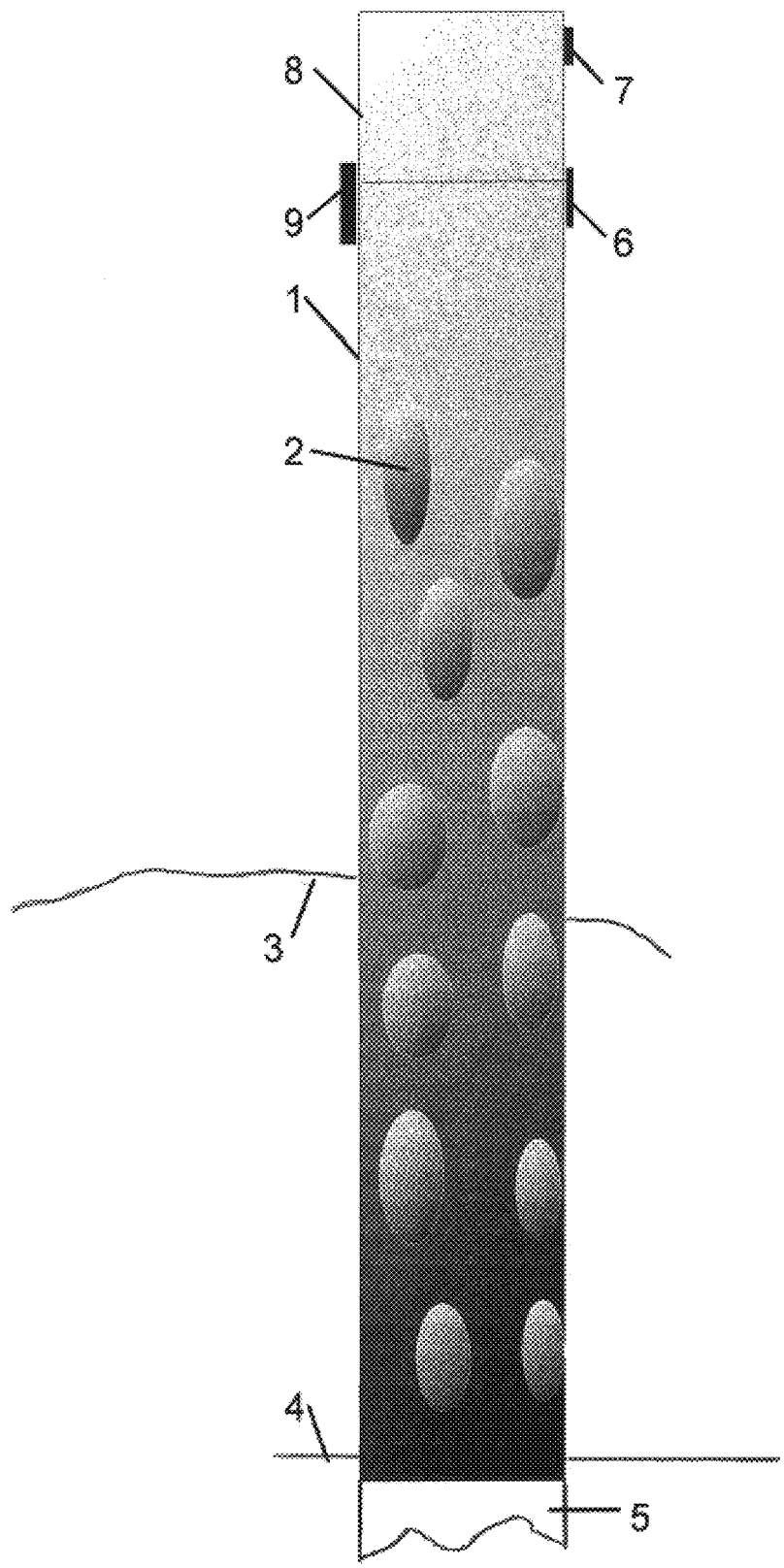

The second figure (labeled "FIG. 2") is a cross sectional view of the Electricity Generating Wave Pipe showing the pipe's interior assemblies. Labeled elements of FIG. 2 include: the pipe (reference character 1), an aperture in the pipe's wall (reference character 2), an ocean wave (reference character 3), the ocean floor (reference character 4), the pipe anchored below the ocean floor (reference character 5), a hinge connecting the pipe with its lid (reference character 6), the protected electrical plug (reference character 7), the pipe cover (reference character 8), the cover locking latch (reference character 9), the generator and drive assembly box (reference character 10), the large clockwise ratchet gear assembly (reference character 11), the main drive gear (reference character 12), the counter weight stop (reference character 13), the belt (reference character 14), the float limit stop (reference character 15), the float (reference character 16), the counter weight (reference character 17), the large counter-clockwise ratchet gear assembly (reference character 18), the reverse gear (reference character 19), the generator drive gear (reference character 20), and the generator (reference character 21).

Figure 2:
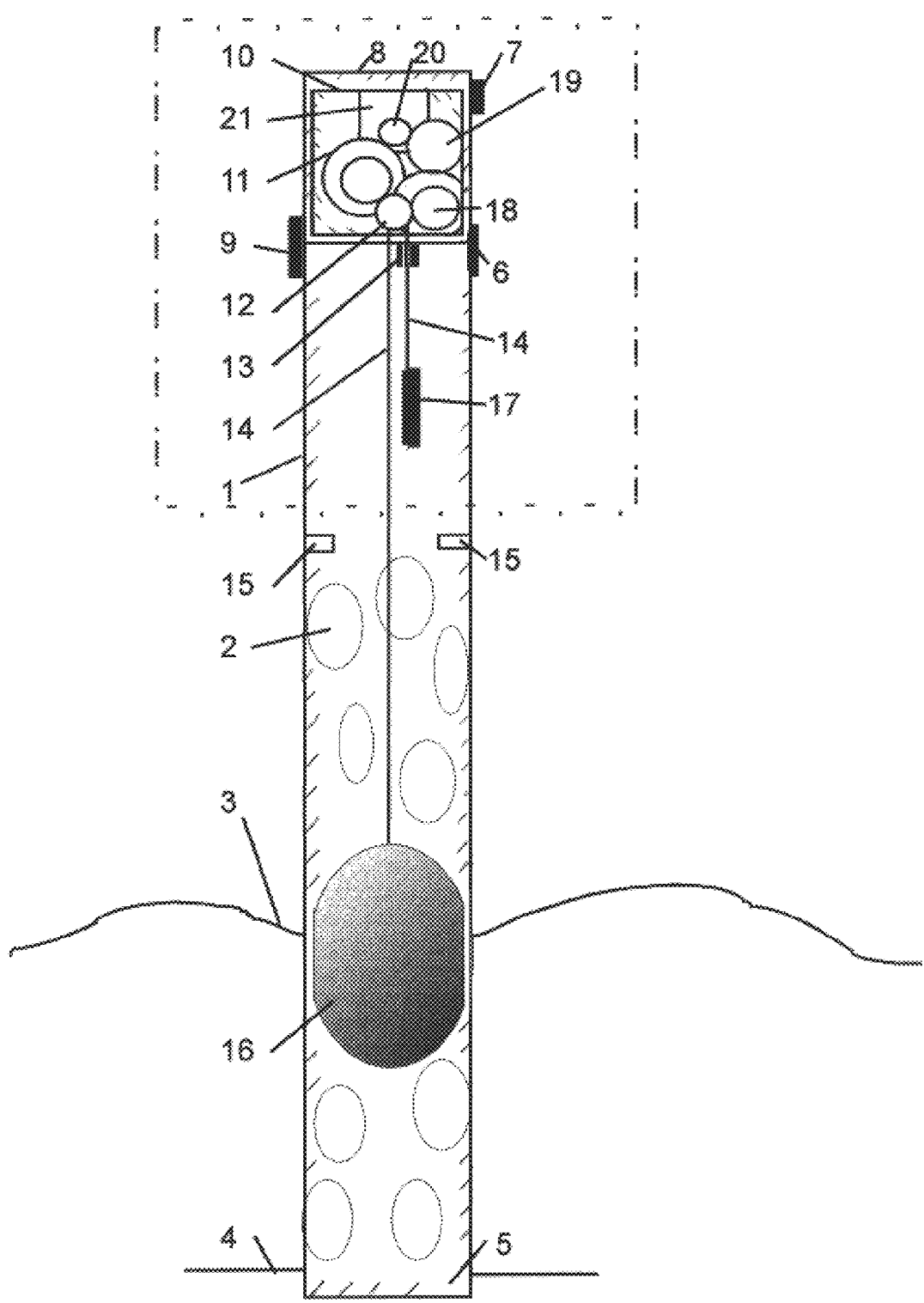
Figure 3:
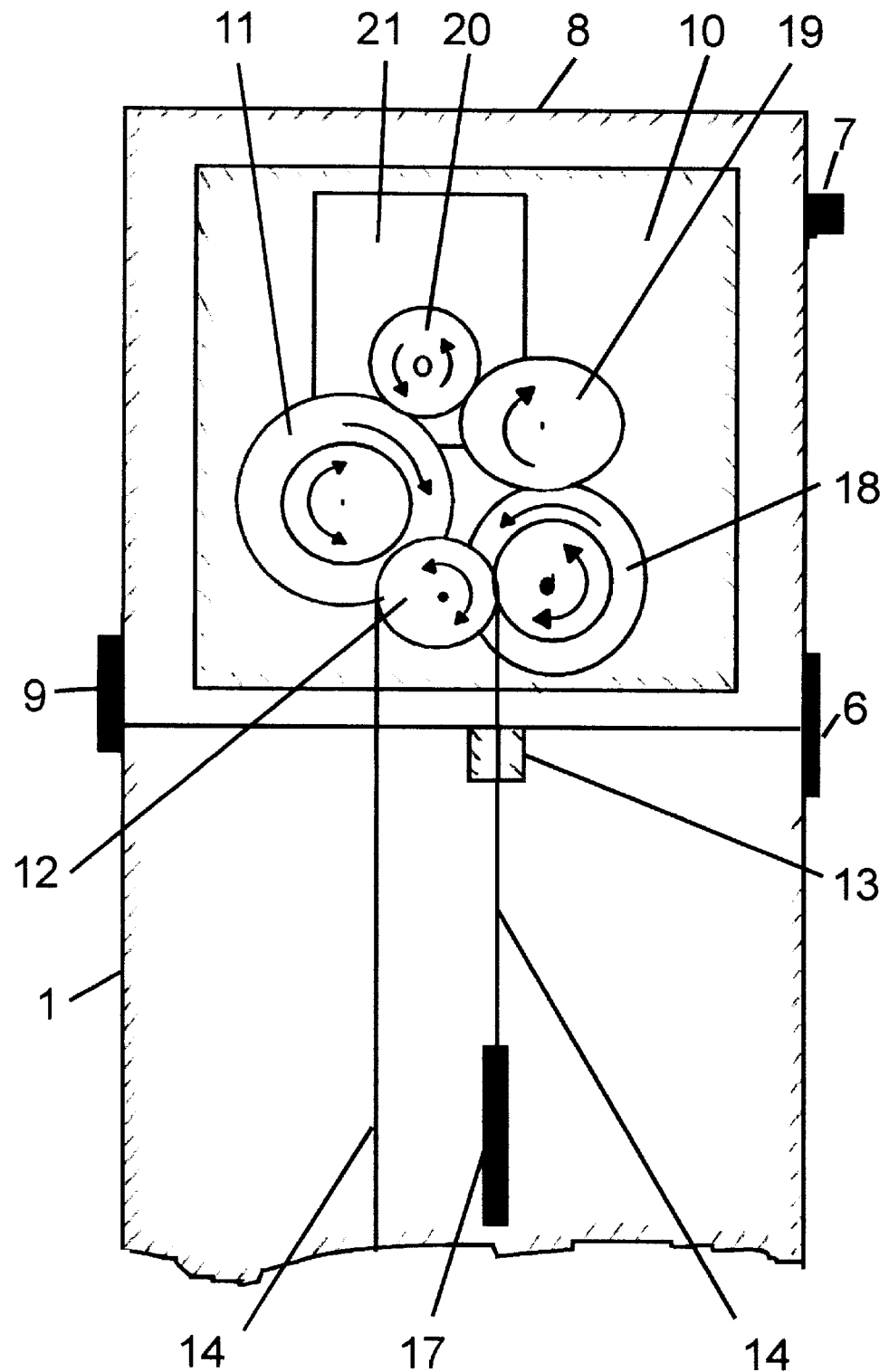

The third figure (labeled "FIG. 3") of the Electricity Generating Wave Pipe is an enlarged view of a portion of FIG. 2. This view (FIG. 3) features an enlarged cross section of the generator and drive assembly box showing the generator and gears and illustrating the direction of gear movement. Labeled elements of FIG. 3 include: the pipe (reference character 1), the hinge connecting the pipe with its lid (reference character 6), the protected electrical plug (reference character 7), the pipe cover (reference character 8), the cover locking latch (reference character 9), the generator and drive assembly box (reference character 10), the large clockwise ratchet gear assembly (reference character 11), the main drive gear (reference character 12), the counter weight stop (reference character 13), the belt (reference character 14), the counter weight (reference character 17), the large counter-clockwise ratchet gear assembly (reference character 18), the reverse gear (reference character 19), the generator drive gear (reference character 20), and the generator (reference character 21).

Figure 4:
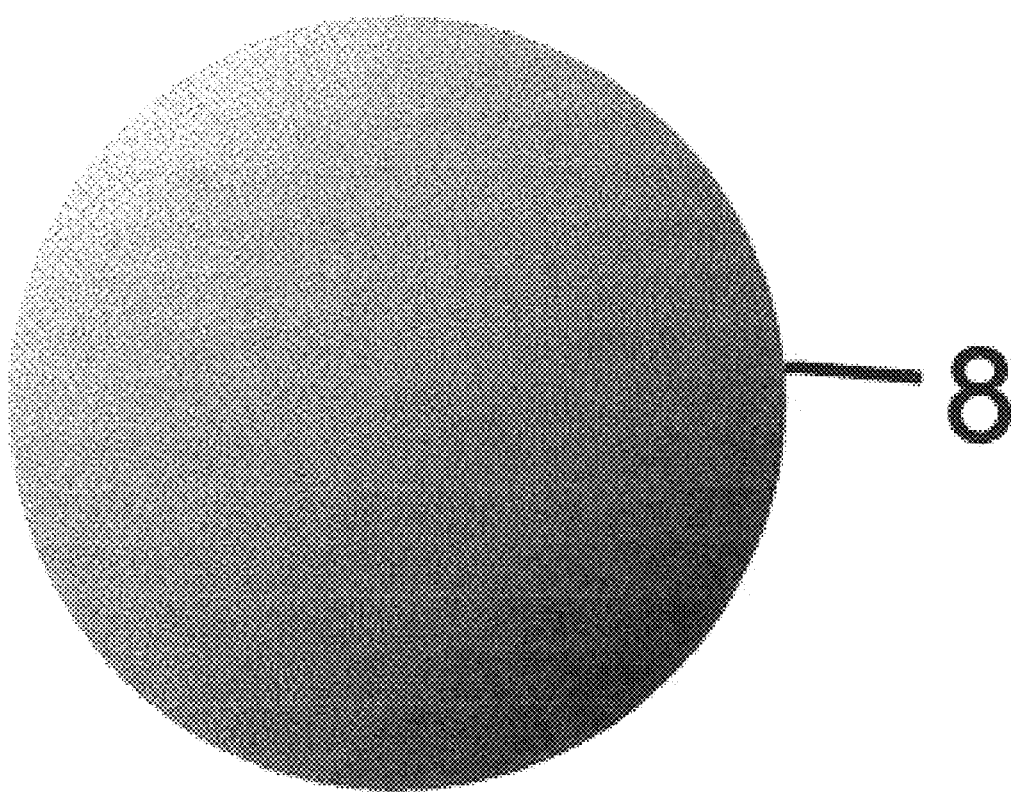

The fourth figure (labeled "FIG. 4") is the top view of the Electricity Generating Wave Pipe showing the pipe cover (reference character 8).

DETAILED DESCRIPTION OF THE INVENTION

This invention is known as the Electricity Generating Wave Pipe (or EGWaP) and was invented by Stanley Rutta. It consists of such elements as follow: a hollow, noncorroding, plastic, fiberglass, or metal pipe, tube, or container whose height must be from the ocean floor to above the highest wave peak and whose length must include the length needed to anchor its bottom securely beneath the ocean floor. From here on, the word pipe will stand for either pipe, tube or container. The height and width (or diameter) of the pipe will vary depending on conditions present and will vary by application. It must be of sufficient size to contain a float and gear and pulley system and support a generator. The surface of this hollow pipe must have apertures sufficient to allow the uninhibited flow of water in and out of the pipe. These apertures can extend from the ocean bottom to the height of the float limit stop. The electro-mechanical chassis is located at the top of the pipe and is covered by a pipe cover to protect it from the elements. A hinge and cover locking latch secure the pipe cover. The electromechanical chassis contains the drive assembly (gear and pulley system) and generator. They are mounted in a generator and drive assembly box to support and protect the mechanisms. Below the chassis, within the pipe's hollow chamber, is a large capsule shaped float that moves up and down with the waves. Attached to this float is a belt that reaches up into the electromechanical chassis box (generator and drive assembly box) through a small hole and wraps around the main drive gear. From here, the belt leaves the electro-mechanical chassis box (generator and drive assembly box) through a small hole and re-enters the pipe chamber through a counter weight stop and terminates at an attached counter weight. The counter weight is of sufficient weight to apply sufficient belt tension to the main drive gear as the float rises and descends with the waves. The counter weight cannot be so heavy that it impedes the float's up and down movement. The distance the float rises and descends is determined by wave peaks and wave valleys. The length of the pipe chamber above the float's range of upward and downward movement should be such that the counter weight does not hit the float when the float rises to its highest point. The counter weight should not reach the electromechanical chassis as the float reaches its lowest point. Emergency stops are in place for both float (float limit stop) and counter weight (counter weight stop) in case of abnormal wave conditions. The main drive gear (as mentioned above) is part of the electro-mechanical chassis. This chassis also contains the following gears that convert clockwise and counter-clockwise (bi-directional) movement of the main drive gear into unidirectional movement of the generator drive gear. In conjunction with the main drive gear, the following gears function to do this: two large ratchet gears that ride on the main drive gear. One of these (the large clockwise ratchet gear assembly) is ratcheted for clockwise movement and the other (the large counter-clockwise ratchet gear assembly) is ratcheted for counter-clockwise movement. The large clockwise ratchet gear assembly rides directly on the generator drive gear. The large counter-clockwise ratchet gear assembly rides on a reverse gear of equal size which also rides on the generator drive gear. This whole gear process (gears and ratchet assemblies) can be set up inversely as well.

The invention described works as follows: when a wave passes the pipe, the water level in the pipe rises. This causes the float to rise and the counter weight to descend. This action causes the belt to rotate and the main drive gear to turn clockwise and the large counter-clockwise ratchet gear assembly to turn counter-clockwise which turns the reverse gear clockwise which continues to turn the generator drive gear counter-clockwise. When the float moves down, the counter weight rises and the belt rotates. This causes the main drive gear to turn counter-clockwise causing the large clockwise ratchet gear assembly to turn clockwise causing the generator drive gear to turn counter-clockwise. Note that these mechanisms insure that either up or down movement of the float will turn the generator drive gear in the same direction. (In this description that direction is counter-clockwise). (If the design was inversely arranged, the generator drive gear would go in the opposite direction).

The generator drive gear is connected to the generator axle and drive and rotates the armature within the generator which produces electricity. A plug that is protected from the elements connects the electrical output of the generator to the transmission line. Alternate uses of the Electricity Generating Wave Pipe would include: using a pump instead of a generator to utilize the power of waves. Underwater cables or above water wiring can connect a number of electricity generating wave pipes or connect one or more of these pipes to land power grids. In some areas, the electricity generating wave pipe or pipes can produce hydrogen and oxygen in optional tanks connected to the pipe.

For the purpose of this invention, a ratchet gear assembly consists of two connected gears—a small inner gear and larger outer gear. On the large clockwise ratchet gear assembly, when the small inner gear turns clockwise, it turns the outer gear clockwise. When the small inner gear turns counter-clockwise, it ratchets and does not drive the outer gear. On the large counter-clockwise ratchet gear assembly, when the small inner gear turns counter-clockwise, it drives its outer gear counter-clockwise. When the inner gear of the large counter-clockwise ratchet gear assembly turns clockwise, it ratchets and does not drive the outer gear.

Although the preferred embodiments of the invention have been disclosed for illustrative purposes, those skilled in the art will appreciate that various changes, modifications, additions and substitutions are possible, without departing from the scope and spirit of the invention as disclosed in the accompanying claims and their equivalents. It should be understood therefore that the invention is not limited to the embodiments, but rather that various changes or modifications therefore are possible without departing from the spirit of the invention. It can also be combined in multiple configurations for various applications. Furthermore, certain terminology has been used for the purpose of descriptive clarity and not to limit the present invention and new ideas. It is therefore intended that the following appended claims include all such alterations, configurations, modifications and permutations as fall within the true spirit and scope of the present invention. It should also be noted at this point that the invention and new ideas presented are not limited to the configurations, apparatus, systems, processes, construction methods, construction materials and scientific principles herein presented, but also include various other forms or configurations that produce other various forms of benefits of which the herein inventor hereby reserves the all the rights and privileges for himself.

What is claimed is:

1. A system, apparatus and method for the transformation of wave motion to useful energy such as electricity, comprising:

at least one hollow pipe, tube or other hollowed out container with an end anchored to the floor of the ocean, sea or other wave producing entity whose length reaches and is significantly extended above the highest wave peak;

said pipe (or tube or container) having apertures that provide uninhibited water flow and said pipe (or tube or container) also containing:

an electro-mechanical chassis box or housing, also called the generator and drive assembly box, that houses and protects a generator and drive assembly and whose parts convert bi-directional movement (clockwise and counter-clockwise) into unidirectional movement, comprising:

said generator, said drive assembly comprising:

a generator drive gear, a main drive gear, a reverse gear that rides on said generator drive gear, a large counter-clockwise ratchet gear assembly that rides on said main drive gear and is ratcheted for counter-clockwise movement and also rides on said reverse gear, a large clockwise ratchet gear assembly that rides on said main drive gear and is ratcheted for clockwise movement and also rides on said generator drive gear, a belt whose course threads around said main drive gear and whose one end enters the said pipe's chamber through a small hole at the bottom of the said generator and drive assembly box and whose end on this side is attached to a float and whose other end leads from said main drive gear, exits the said generator and drive assembly box through a small opening and enters said pipe's chamber through a counter weight stop and terminates at this end with an attached counter weight;

said counter weight is of sufficient weight to apply sufficient belt tension to said main drive gear as said float rises and descends with the waves while not impeding the said float's up and down movement within said pipe's chamber;

said counter weight stop prevents damage to the said generator and drive assembly box from said counter weight;

said float is kept from float skew by walls of said pipe and said float is kept from interfering with the said counter weight by float limit stops placed in the said pipe; and wherein said pipe is covered by a pipe cover which is attached and secured by a cover locking latch and hinge; and a protected electrical plug connects the electrical output of said generator to the transmission line.

2. The mechanism according to claim 1, wherein as said float rises, said counter weight descends, causing said belt to rotate and said main drive gear to turn clockwise and said large counter-clockwise ratchet gear assembly to turn counter-clockwise which turns said reverse gear clockwise which continues to turn said generator drive gear counter-clockwise.

3. The mechanism according to claim 1, wherein as said float moves down, said counter weight rises causing said belt to rotate causing said main drive gear to turn counter-clockwise causing said large clockwise ratchet gear assembly to turn clockwise causing said generator drive gear to turn counter-clockwise.

4. The mechanism according to claim 1, insures that either up or down movement of said float will turn said generator drive gear in the same direction.

5. The mechanism according to claim 4, can be used to turn said generator drive gear either counter-clockwise or be inversely arranged so said generator drive gear is made to go clockwise.

6. The mechanism according to claim 1, has said generator drive gear connected to said generator's axle and drive and rotates armature within said generator to produce electricity.

* * * * *